US011327271B2

(12) United States Patent
Tseng et al.

(10) Patent No.: US 11,327,271 B2
(45) Date of Patent: *May 10, 2022

(54) LENS DRIVING APPARATUS, PHOTOGRAPHING MODULE AND ELECTRONIC DEVICE

(71) Applicant: LARGAN DIGITAL CO., LTD., Taichung (TW)

(72) Inventors: Te-Sheng Tseng, Taichung (TW); Wen-Hung Hsu, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 355 days.

This patent is subject to a terminal disclaimer.

(21) Appl. No.: 16/515,128

(22) Filed: Jul. 18, 2019

(65) Prior Publication Data

US 2019/0339482 A1 Nov. 7, 2019

Related U.S. Application Data

(63) Continuation of application No. 15/895,134, filed on Feb. 13, 2018, now Pat. No. 10,401,591.

(30) Foreign Application Priority Data

Oct. 18, 2017 (TW) .................................. 106135763

(51) Int. Cl.
*G02B 7/02* (2021.01)
*G02B 15/14* (2006.01)
(Continued)

(52) U.S. Cl.
CPC ............... *G02B 7/09* (2013.01); *G02B 7/026* (2013.01); *G02B 7/04* (2013.01); *G02B 7/08* (2013.01);
(Continued)

(58) Field of Classification Search
CPC .... G03B 2205/0038; G03B 2205/0069; G03B 3/10; G03B 17/14; G03B 3/02;
(Continued)

(56) References Cited

U.S. PATENT DOCUMENTS 7,701,651 B2 4/2010 Chang
9,282,247 B2 3/2016 Park
(Continued)

FOREIGN PATENT DOCUMENTS

CN 204068636 U 12/2014
TW 200919063 A 5/2009
(Continued)

*Primary Examiner* — Dawayne Pinkney
(74) *Attorney, Agent, or Firm* — McClure, Qualey & Rodack, LLP

(57) ABSTRACT

A lens driving apparatus includes a holder, a metal cover, a carrier, a sensing magnet, a printed circuit board, a position sensor, a coil and at least one driving magnet. The metal cover is coupled with the holder and has an opening. The carrier is assembled to a lens assembly having an optical axis, wherein the carrier is disposed in the metal cover and is movable along a direction parallel to the optical axis. The sensing magnet is coupled with the carrier. The printed circuit board is disposed near to one of the four lateral sides of the holder. The position sensor is disposed on the printed circuit board and corresponds to the sensing magnet. The coil is disposed on an outer surface of the carrier. One of the driving magnet is disposed in the metal cover and corresponds to the coil.

20 Claims, 15 Drawing Sheets

(51) Int. Cl.

| | |
|---|---|
| *G03B 17/00* | (2021.01) |
| *H04N 5/225* | (2006.01) |
| *G02B 7/09* | (2021.01) |
| *H02K 41/035* | (2006.01) |
| *G02B 7/04* | (2021.01) |
| *G02B 7/28* | (2021.01) |
| *G03B 13/36* | (2021.01) |
| *G03B 3/10* | (2021.01) |
| *G02B 7/08* | (2021.01) |
| *G02B 13/00* | (2006.01) |
| *G03B 13/18* | (2021.01) |

(52) U.S. Cl.
CPC .............. *G02B 7/28* (2013.01); *G03B 3/10* (2013.01); *G03B 13/36* (2013.01); *H02K 41/0354* (2013.01); *H02K 41/0356* (2013.01); *G02B 7/02* (2013.01); *G02B 13/001* (2013.01); *G03B 13/18* (2013.01); *G03B 17/00* (2013.01)

(58) Field of Classification Search
CPC . G03B 5/00; G03B 5/04; G03B 13/00; G03B 13/16; G03B 13/18; G03B 13/32; G03B 13/34; G03B 13/36; G03B 17/00; G03B 17/02; G02B 7/00; G02B 7/02; G02B 7/023; G02B 7/026; G02B 7/04; G02B 7/08; G02B 7/09; G02B 7/28; G02B 7/282; G02B 7/285; G02B 7/102; G02B 13/001; G02B 27/646; G02B 15/173; G02B 7/10; G02B 7/021; H04K 41/00; H04K 41/02; H04K 41/0354; H04K 41/0356; H04N 5/225; H04N 5/2253; H04N 5/232; H04N 5/23212; G11B 7/0932

USPC ........ 359/811–830, 694–696, 676–701, 557; 396/52, 55, 72, 77–82, 85, 87, 133, 439; 348/345, 349, 374

See application file for complete search history.

(56) References Cited

U.S. PATENT DOCUMENTS

| | | | |
|---|---|---|---|
| 9,319,573 | B2 | 4/2016 | Oh |
| 9,360,653 | B2 | 6/2016 | Lee et al. |
| 9,547,216 | B2 | 1/2017 | Jung et al. |
| 9,568,743 | B2 | 2/2017 | Hayashi |
| 9,575,283 | B2 | 2/2017 | Lee et al. |
| 9,575,285 | B2 | 2/2017 | Dong et al. |
| 9,690,070 | B2 | 6/2017 | Lee et al. |
| 9,696,515 | B2 | 7/2017 | Hsu |
| 9,720,204 | B2 | 8/2017 | Yoo et al. |
| 2004/0058231 | A1* | 3/2004 | Takeshita ............ H01M 50/572 429/123 |
| 2014/0063273 | A1 | 3/2014 | Park |
| 2015/0323758 | A1 | 11/2015 | Lee et al. |
| 2016/0028297 | A1 | 1/2016 | Hsu |
| 2016/0187668 | A1 | 6/2016 | Hayashi |
| 2017/0017056 | A1 | 1/2017 | Park et al. |
| 2019/0041661 | A1* | 2/2019 | Murakami ............... G02B 7/08 |

FOREIGN PATENT DOCUMENTS

| | | |
|---|---|---|
| TW | 201304362 A | 1/2013 |
| TW | 201319612 A | 5/2013 |
| TW | 201403160 A | 1/2014 |
| TW | 201500796 A | 1/2015 |

* cited by examiner

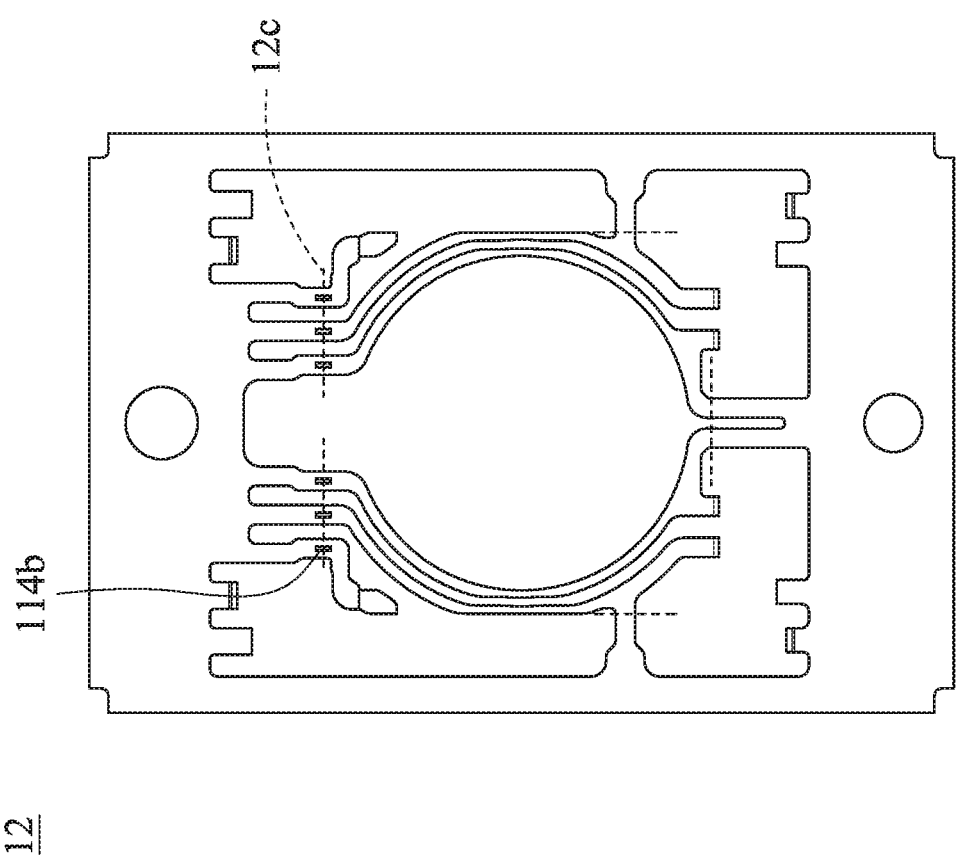

LENS DRIVING APPARATUS, PHOTOGRAPHING MODULE AND ELECTRONIC DEVICE

RELATED APPLICATIONS

The present application is a Continuation of U.S. application Ser. No. 15/895,134, filed on Feb. 13, 2018, which claims priority of Taiwan Application Serial Number 106135763, filed Oct. 18, 2017, which is herein incorporated by reference.

BACKGROUND

Technical Field

The present disclosure relates to a lens driving apparatus and a photographing module. More particularly, the present disclosure relates to a lens driving apparatus and a photographing module applied to portable electronic devices.

Description of Related Art

For lens assemblies applied to electronic devices nowadays, a voice coil motor (VCM) is usually served as a lens driving apparatus for auto-focusing. However, the aforementioned lens driving apparatus is usually made up of several essential elements, so that there is a need for a compact size of the lens assembly under a premise without omitting the essential elements.

Furthermore, a position sensor is an essential element of the lens driving apparatus. However, the structure accuracy of the position sensor is easily damaged by the high temperature of the welding work during the assembling process thereof, thus the detection sensitivity and the accuracy of the position sensor will be affected.

Therefore, how to design a lens driving apparatus with a compact size and a high sensibility under a premise of having a fast focus function has become an important issue in the field of the modern lens driving apparatus.

SUMMARY

The present disclosure provides a lens driving apparatus including a holder, a metal cover, a carrier, a sensing magnet, a printed circuit board, a position sensor, a coil and at least one driving magnet. The holder is a rectangle and has a central opening and four lateral sides. The metal cover is coupled with the holder and has an opening corresponding to the central opening of the holder. The carrier is assembled to a lens assembly having an optical axis, wherein the carrier is disposed in the metal cover and is movable along a direction parallel to the optical axis. The sensing magnet is coupled with the carrier. The printed circuit board is disposed near to one of the four lateral sides of the holder in an upright form. The position sensor is disposed on the printed circuit board and corresponds to the sensing magnet for detecting a displacement parallel to the optical axis of the sensing magnet. The coil is disposed on an outer surface of the carrier. One of the driving magnets is disposed in the metal cover and corresponds to the coil. Wherein the holder further includes a plurality of first metal terminals and a plurality of second metal terminals, each of the first metal terminals is outwardly extended from the holder along the direction parallel to the optical axis, and each of the second metal terminals is fixedly connected with the printed circuit board. Wherein the first metal terminals are disposed only on one of the lateral sides of the holder, a number of the first metal terminals is at least three, the second metal terminals are disposed on at least one of the other three lateral sides of the holder, and a number of the second metal terminals is at least three.

According to another aspect of the present disclosure, a photographing module includes the lens driving apparatus according to the aforementioned aspect and an image sensor for receiving an imaging light from the lens assembly.

According to another aspect of the present disclosure, an electronic device includes the photographing module according to the aforementioned aspect.

BRIEF DESCRIPTION OF THE DRAWINGS

The present disclosure can be more fully understood by reading the following detailed description of the embodiment, with reference made to the accompanying drawings as follows:

FIG. 6C is a back schematic view of the metal plate of FIG. 6B;

DETAILED DESCRIPTION

1st Embodiment

Figure 1:
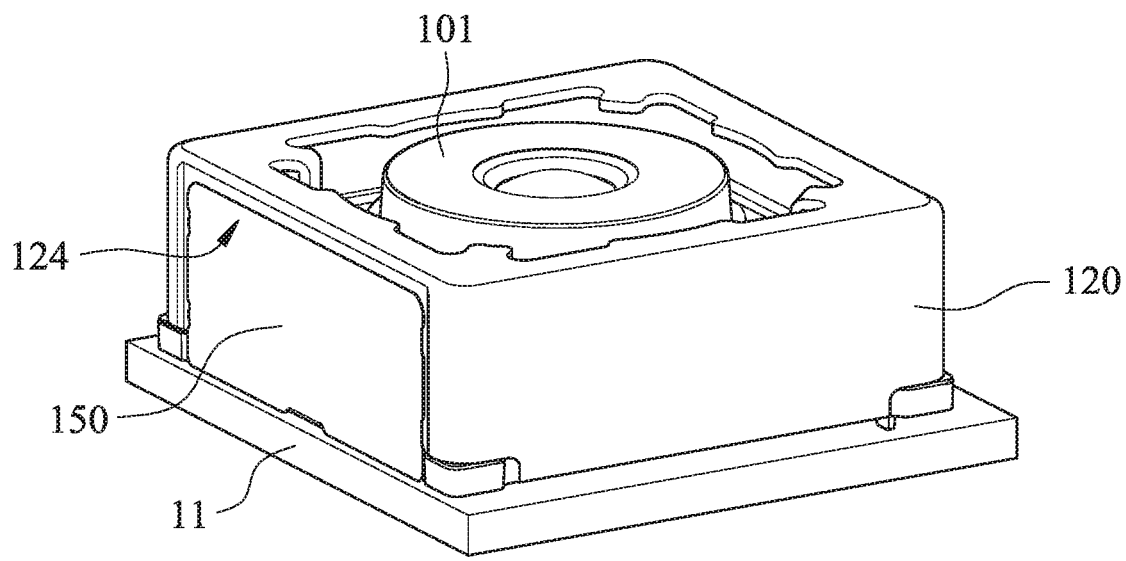
FIG. 1 is a three-dimensional schematic view of a photographing module according to the 1st embodiment of the present disclosure.
Figure 2:
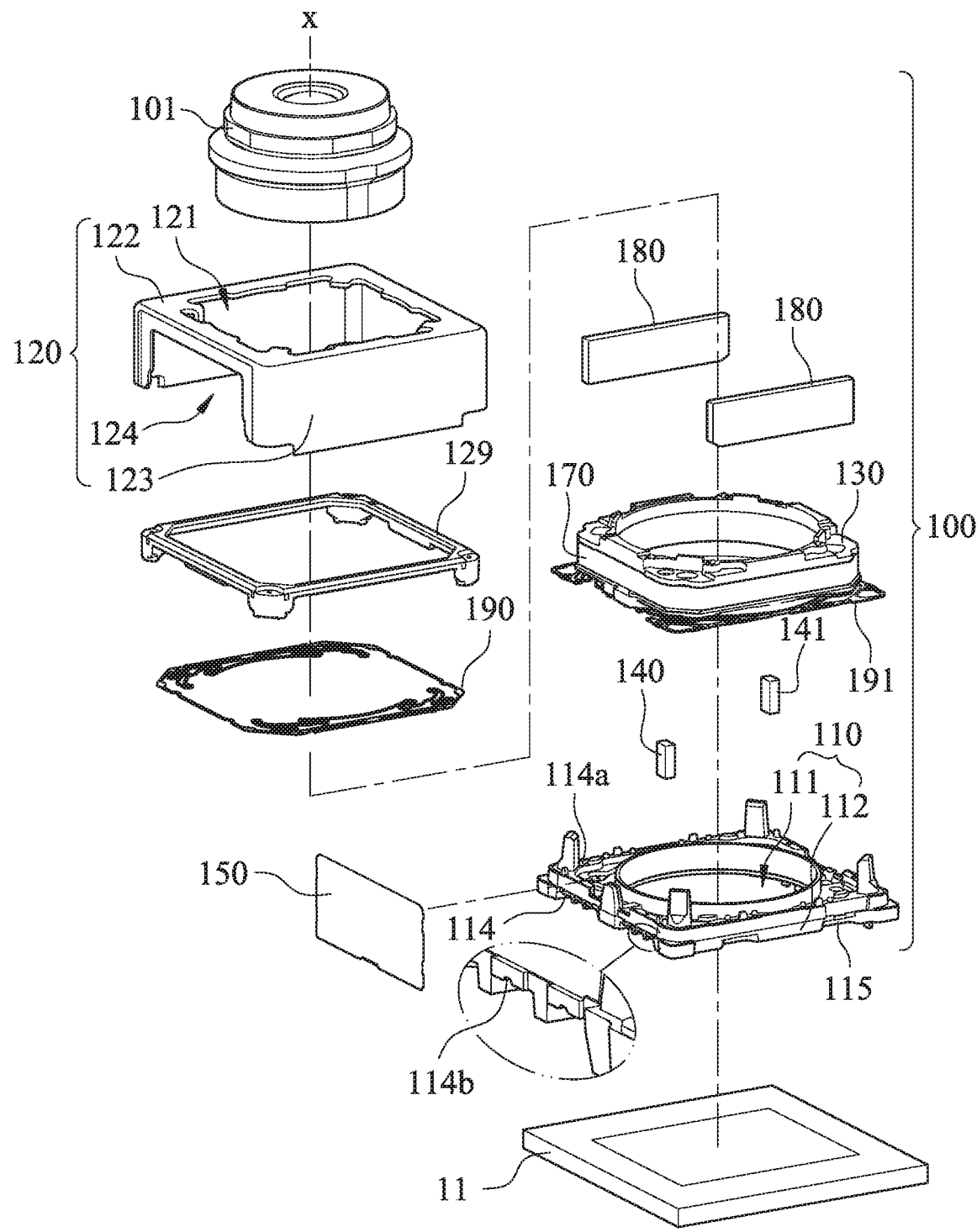
FIG. 2 is an exploded schematic view of the photographing module according to the 1st embodiment of FIG. 1.
Figure 3:
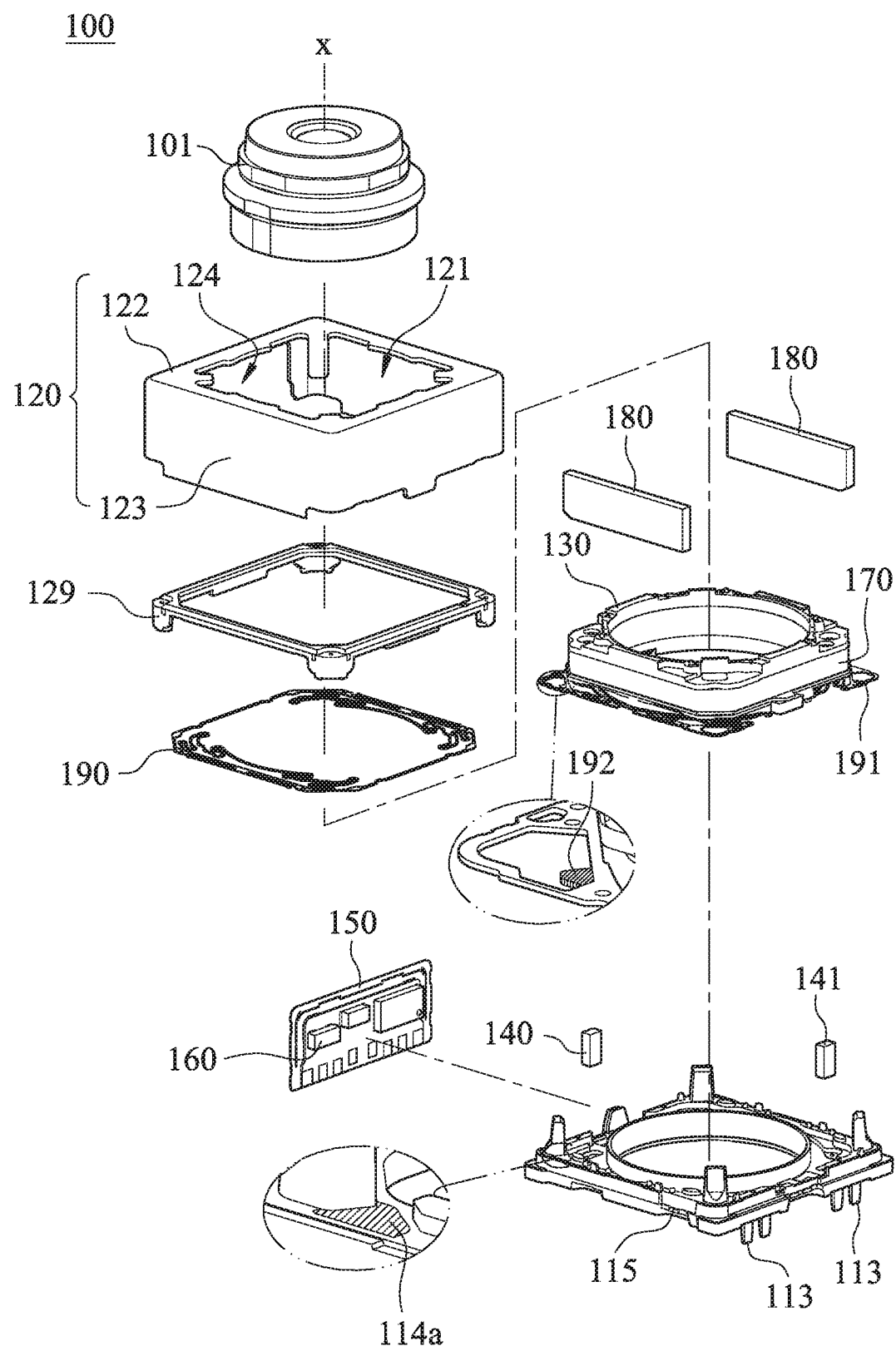
FIG. 3 is an exploded schematic view at another angle of a lens driving apparatus according to the 1st embodiment of FIG. 1.

FIG. 1 is a three-dimensional schematic view of a photographing module 10 according to the 1st embodiment of the present disclosure. FIG. 2 is an exploded schematic view of the photographing module 10 according to the 1st embodiment of FIG. 1. FIG. 3 is an exploded schematic view at another angle of a lens driving apparatus 100 according to the 1st embodiment of FIG. 1. In FIG. 1, FIG. 2 and FIG. 3, the photographing module 10 includes a lens driving apparatus 100 and an image sensor 11, wherein the image sensor 11 is for receiving an imaging light from a lens assembly 101 of the lens driving apparatus 100. The lens driving apparatus 100 includes a holder 110, a metal cover 120, a carrier 130, a sensing magnet 140, a printed circuit board 150, a position sensor 160, a coil 170 and at least one driving magnet 180.

The holder 110 is a rectangle and has a central opening 111 and four lateral sides 112. The metal cover 120 is coupled with the holder 110 and has an opening 121 corresponding to the central opening 111 of the holder 110. The carrier 130 is assembled to the lens assembly 101, and the lens assembly 101 has an optical axis X, wherein the carrier 130 is disposed in the metal cover 120 and is movable, but not limited to, along a direction parallel to the optical axis X. The sensing magnet 140 is coupled with the carrier 130. The printed circuit board 150 is disposed near to one of the four lateral sides 112 of the holder 110 in an upright form, that is, the printed circuit board 150 is disposed on the lateral side 112 of the holder 110 along the direction parallel to the optical axis X. The position sensor 160 is disposed on the printed circuit board 150 and corresponds to the sensing magnet 140 for detecting a displacement parallel to the optical axis X of the sensing magnet 140, wherein the position sensor 160 can be a Hall sensor or a Hall element. The coil 170 is disposed on an outer surface of the carrier 130. The driving magnet 180 is disposed in the metal cover 120 and corresponds to the coil 170.

The sensing magnet 140 detected by the position sensor 160 generates the displacement related to the position sensor 160 along to a movement of the carrier 130 so as to change a magnetic field detected by the position sensor 160 accordingly. Accordingly, different voltage signals can be feedbacked so that the carrier 130 can drive the lens assembly 101 to move toward a predetermined position without moving the carrier 130 back to the initial position before moving to the predetermined position. Therefore, the effect of fast focusing can be obtained. The driving magnet 180 is disposed correspondingly and next to the coil 170, so that the interaction between the driving magnet 180 and the coil 170 can be balanced so as to steadily move the carrier 130 by force as well as steadily drive the lens assembly 101 moving telescopically, simultaneously.

Figure 4:
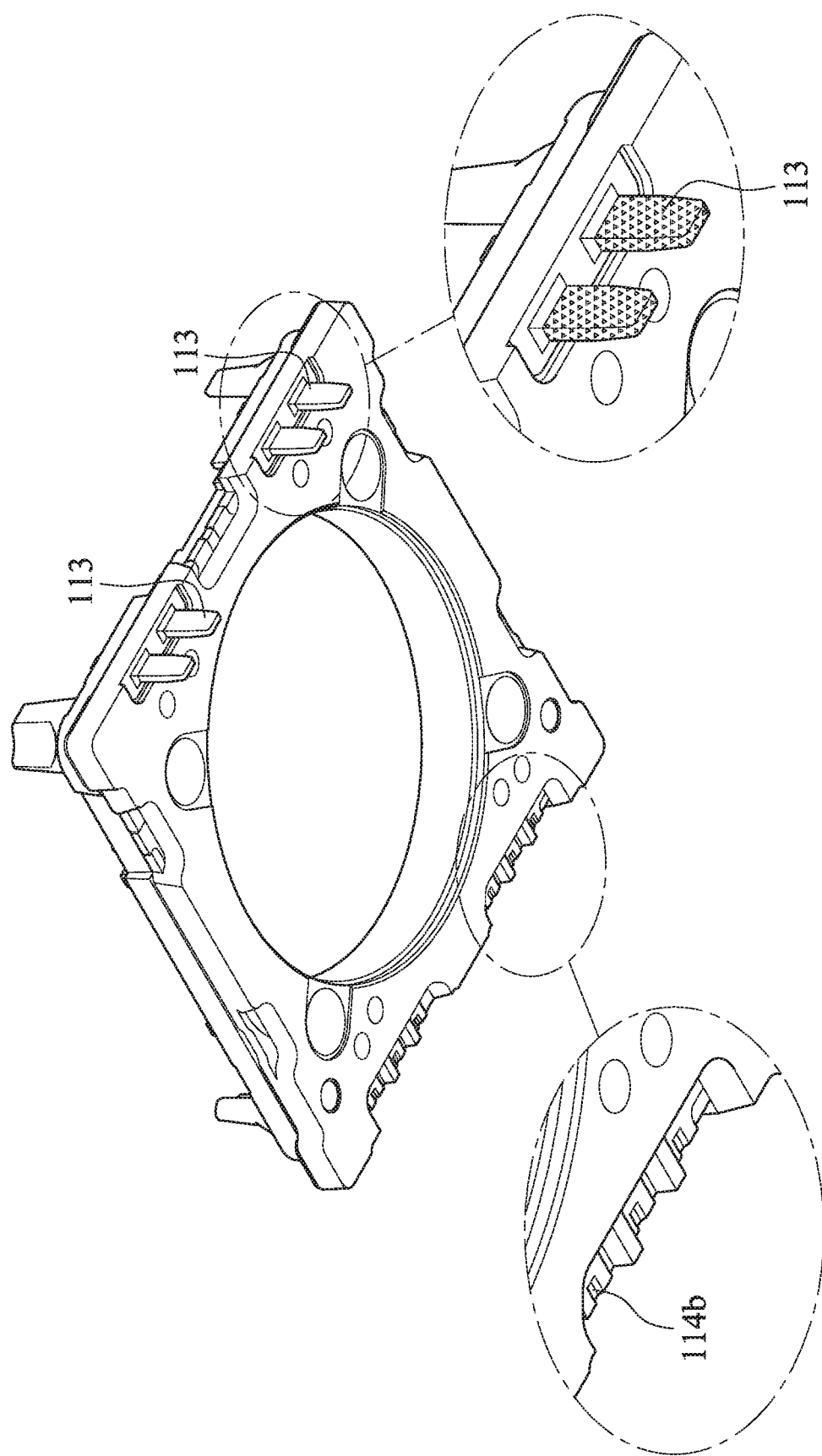
FIG. 4 is a schematic view of the first metal terminals of a holder according to the 1st embodiment of FIG. 1.
Figure 5:
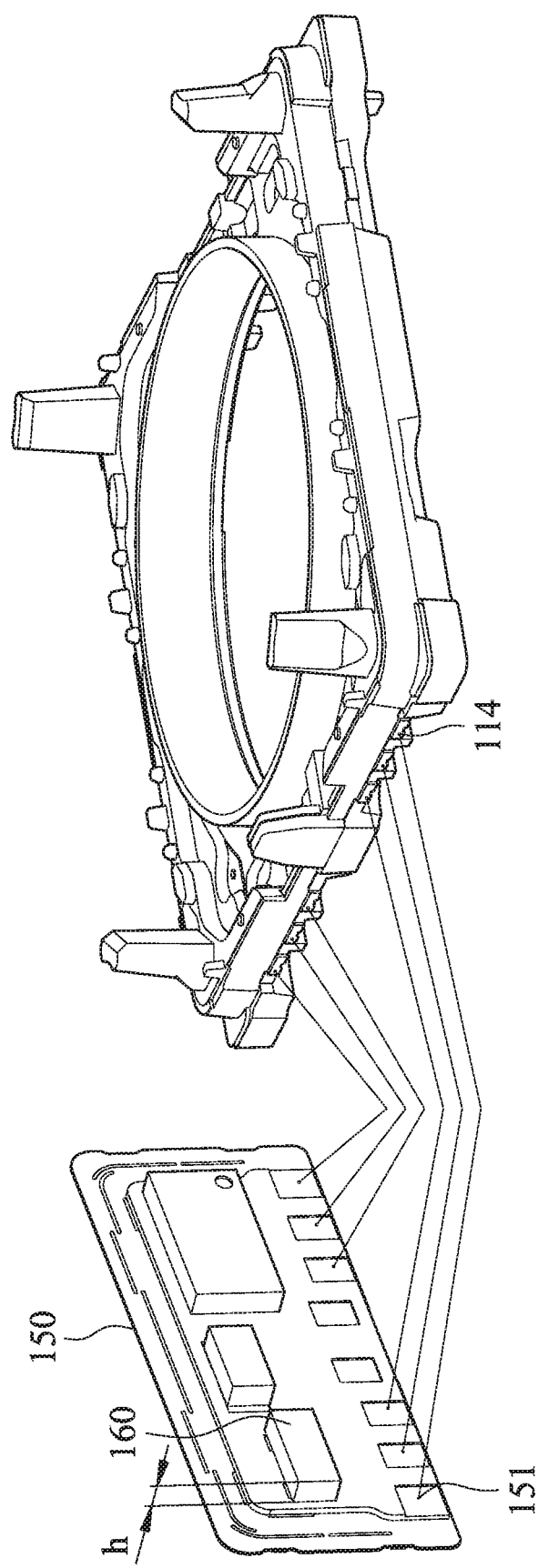
FIG. 5 is a schematic view of the second metal terminals of the holder according to the 1st embodiment of FIG. 1.

FIG. 4 is a schematic view of the first metal terminals 113 of the holder 110 according to the 1st embodiment of FIG. 1. FIG. 5 is a schematic view of the second metal terminals 114 of the holder 110 according to the 1st embodiment of FIG. 1. The holder 110 further includes a plurality of first metal terminals 113 and a plurality of second metal terminals 114, wherein each of the first metal terminals 113 is outwardly extended from the holder 110 along the direction parallel to the optical axis X, and each of the second metal terminals 114 is fixedly connected with the printed circuit board 150. The first metal terminals 113 are disposed only on one of the lateral sides 112 of the holder 110, and a number of the first metal terminals 113 is at least three. As shown in FIG. 3 and FIG. 4, the number of the first metal terminals 113 of the 1st embodiment is four. The second metal terminals 114 are disposed on at least one of the others three lateral sides 112 of the holder 110, and a number of the second metal terminals 114 is at least three. As shown in FIG. 2 and FIG. 5, the number of the second metal terminals 114 of the 1st embodiment is six, and all of the second metal terminals 114 are disposed on the lateral side 112 corresponding to the printed circuit board 150. Therefore, it is favorable for maintaining a compact size of the lens driving apparatus 100 with a fast focus function by the overall arrangement, and the structure accuracy of the position sensor 160 will not be damaged by the high temperature of the welding work during the assembling process thereof so as to maintain the detection sensitivity and the accuracy of the position sensor 160.

As shown in FIG. 3 and FIG. 4, the lens driving apparatus 100 according to the 1st embodiment of the present disclosure can further include an upper leaf spring 190 and a lower leaf spring 191. The upper leaf spring 190 is connected to the carrier 130, and the lower leaf spring 191 is grouped with the upper leaf spring 190 but separately connected to the carrier 130 along the optical axis X, wherein the aforementioned arrangement of the upper leaf spring 190 and the lower leaf spring 191 can provide degrees of freedom along a first direction (that is, the direction along the optical axis X). In detail, the lower leaf spring 191 is disposed on one side of the carrier 130 near to the holder 110, the lower leaf spring 191 includes a terminal connecting section 192, and the terminal connecting section 192 is electrically connected with two of the second metal terminals 114. Therefore, the complexity of the assembling process can be simplified so as to enhance the production efficiency.

Figure 6A:
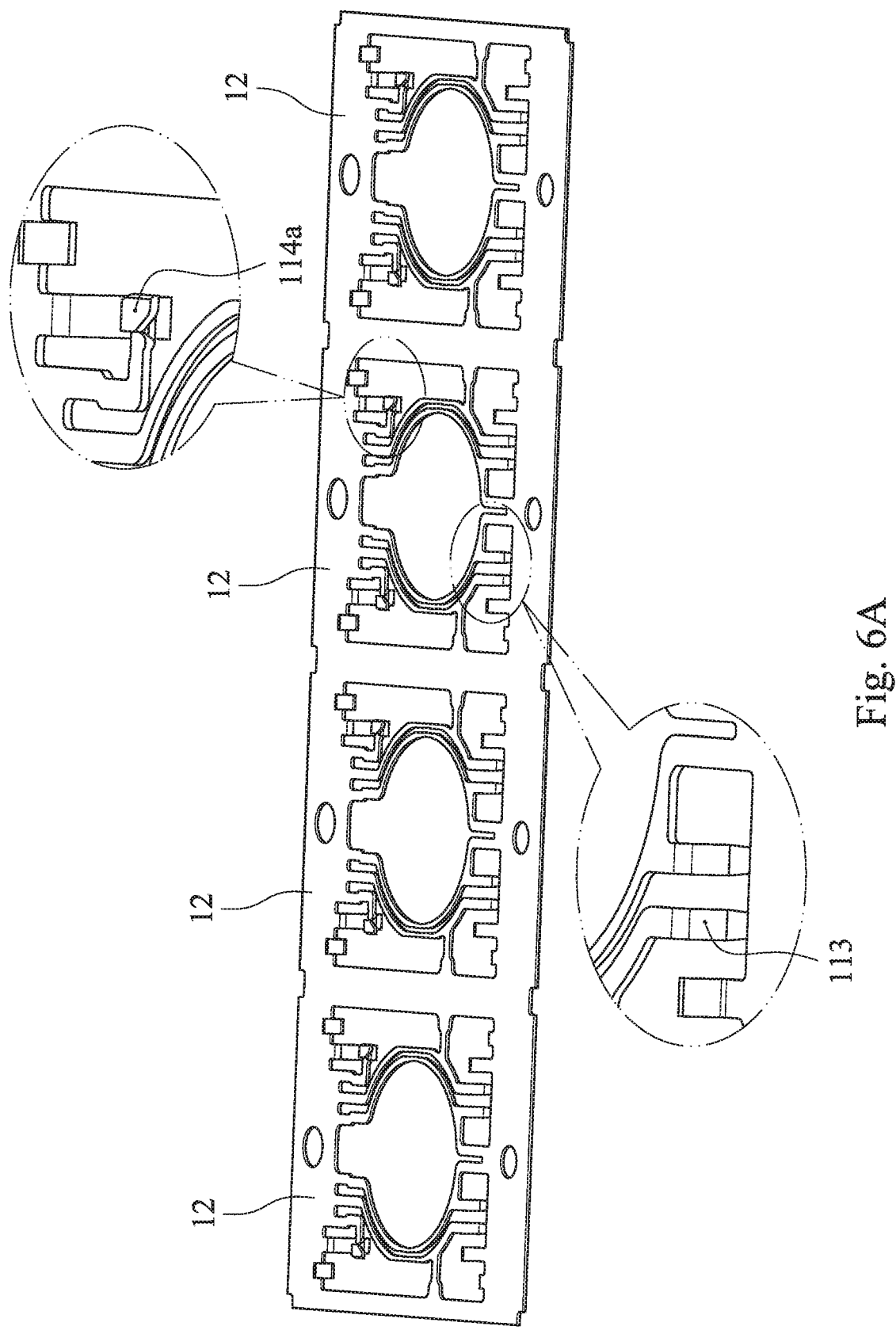
FIG. 6A is a three-dimensional schematic view of a plurality of metal plates disposed with the first metal terminals and the second metal terminals.
Figure 6B:
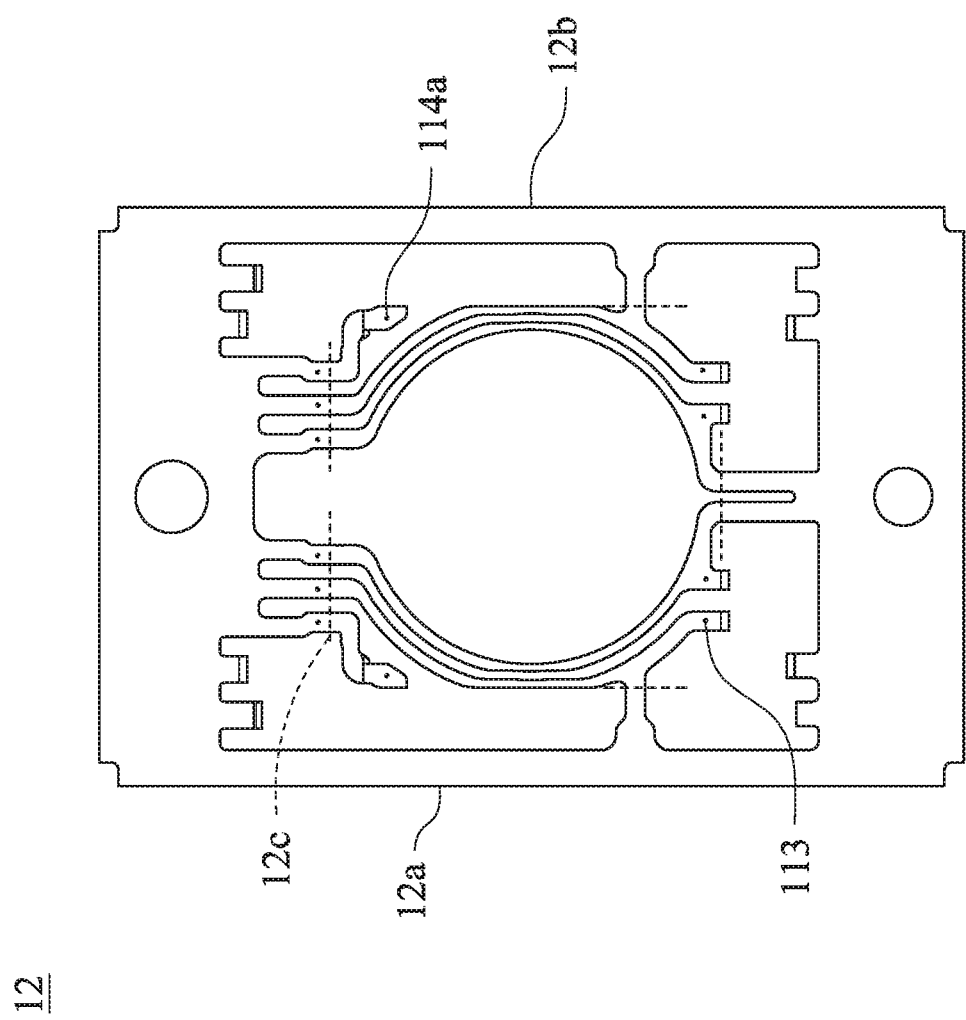
FIG. 6B is a front schematic view of one of the metal plates of FIG. 6A.

In the 1st embodiment of the present disclosure, each of the first metal terminals 113 and each of the second metal terminals 114 are inserted in the holder 110 by an insert molding process. Please refer to FIG. 6A, FIG. 6B and FIG. 6C. FIG. 6A is a three-dimensional schematic view of a plurality of metal plates 12 disposed with the first metal terminals 113 and the second metal terminals 114. FIG. 6B is a front schematic view of one of the metal plates 12 of FIG. 6A. FIG. 6C is a back schematic view of the metal plate 12 of FIG. 6B. As shown in FIG. 6A, a plurality of the metal plates can be made of a metal material during the manufacturing process. Furthermore, as shown in FIG. 6B and FIG. 6C, one of the metal plates 12 has a plurality of metal wires after cutting, and a plurality of desired metal terminals can be obtained by a properly cutting process along the cutting marks 12c, wherein the desired metal terminals include the first metal terminals 113 and the second metal terminals 114. In the actual manufacturing process, the cut metal plate 12 is buried into the holder 110 before the holder 110 is molded by a plastic injection molding process, and the first metal terminals 113 as well as the second metal terminals 114 are exposed after molding of the holder 110, that is, the first metal terminals 113 and the second metal terminals 114 are inserted on the holder 110 so as to facilitate being electrically connected to other elements. Therefore, the size of the holder 110 can be effectively reduced and assembling tolerance between the metal terminals (including the first metal terminals 113 and the second metal terminals 114) and the holder 110 can be eliminated. The sequence of the aforementioned cutting process as well as the insert molding process can be but not limited to process the cutting process before the insert molding process, or to process the insert molding process and then process the cutting process, so that it is favorable for enhancing the production efficiency. The first metal terminals 113 can be outwardly extended from the holder 110 along the direction parallel to the optical axis X, and the extended pattern of the first metal terminal 113 can be a straight extension or include a turning or a hemispherical extension. The second metal terminals 114 can have an arc shape and extend around the central opening 111 of the holder 110, so that over-intensive arrangement of the second metal terminals 114 can be prevented so as to reduce short circuits. Furthermore, in addition to the first metal terminals 113 and the second metal terminals 114, the holder 110 can further include at least one spare metal terminal 115 disposed on one of the lateral sides 112 of the holder 110, and the spare metal terminal 115 can be served as a spare welded position of the first metal terminals 113 or the second metal terminals 114 so as to corresponding arrange for the adjusted production process.

Furthermore, a surface of each of the first metal terminals 113 includes a gilding layer. As shown in FIG. 4, in the enlarged schematic view of the first metal terminals 113, the sprinkle dots on the first metal terminals 113 are presented the gilding layers and the reference numerals of the gilding layers are omitted. Therefore, the quality of signal transmission can be enhanced, and the signal noise of electronic control, such as high frequency noise, can be avoided.

At least two of the first metal terminals 113 are electrically connected with at least two of the second metal terminals 114. Therefore, the manufacturing process of the welding points can be reduced, and the effects of the high temperature during the welding work to the elements can be reduced.

Figure 6D:
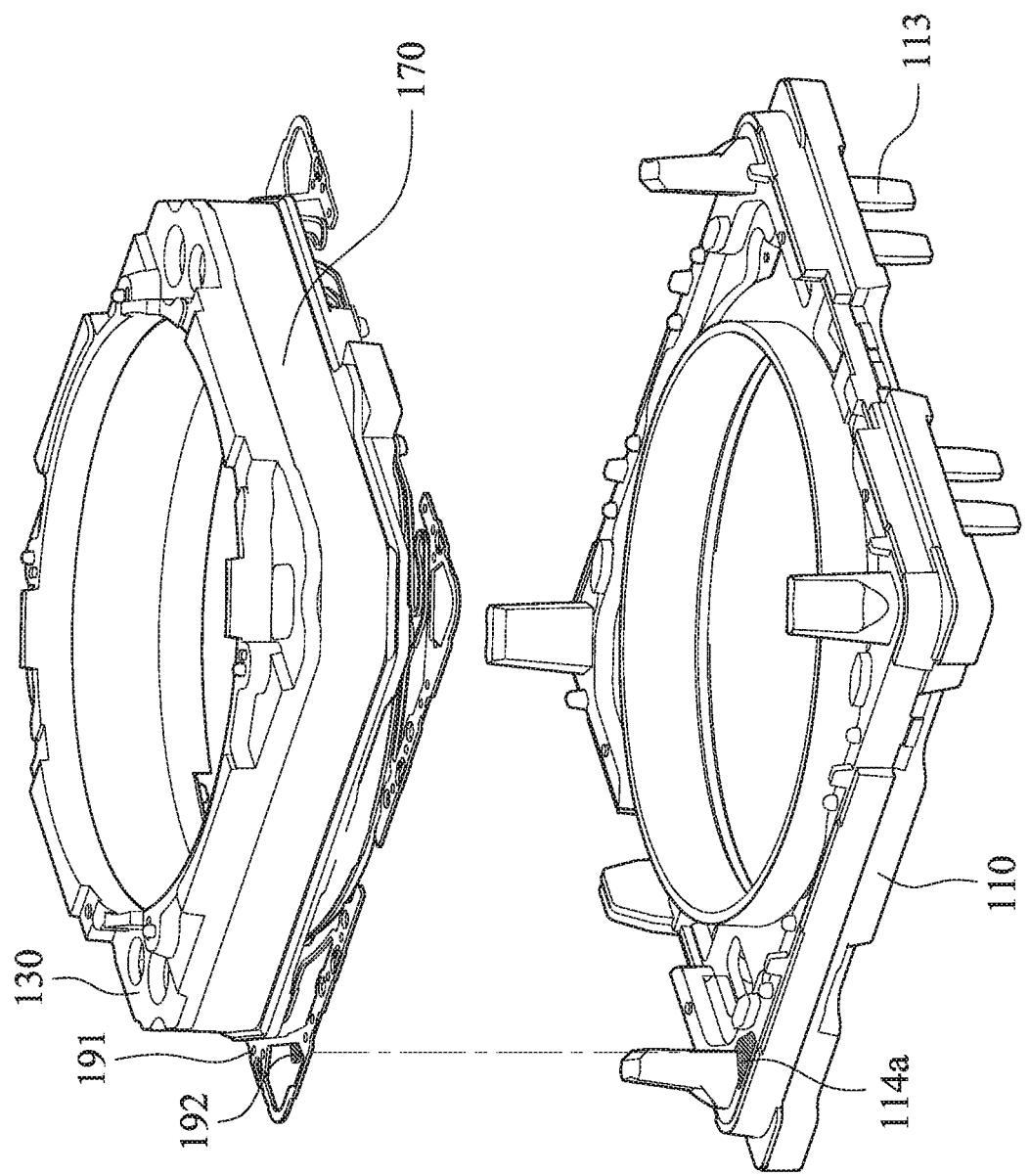
FIG. 6D is a schematic view of a lower leaf spring and the holder according to the 1st embodiment of FIG. 1.

In detail, FIG. 6D is a schematic view of a lower leaf spring 191 and the holder 110 according to the 1st embodiment of FIG. 1. As shown in FIG. 6B and FIG. 6D, in the 1st embodiment, six of the second metal terminals 114 are disposed side by side on the metal plate 12, and each of the two second metal terminals 114 is electrically connected with the terminal connecting section 192 of the lower leaf spring 191 includes a connecting portion 114a. As shown in FIG. 6B, the two second metal terminals 114 including the connecting portions 114a are the two of the six second metal terminals 114 being the closest to two sides 12a, 12b of the metal plate 12, and the connecting portions 114a of the two second metal terminals 114 are for electrically connecting with the terminal connecting section 192. Therefore, corresponding structural features of the second metal terminals 114 and the lower leaf spring 191 can be obtained (that is, the connecting portion 114a and the terminal connecting section 192), so that the stability after assembling can be enhanced and the conduction defects are not easy to occur.

Moreover, at least two other of the second metal terminals 114 are without the connecting portions 114a and integrated with at least two of the first metal terminals 113, respectively. Therefore, the usage of conductive lines can be reduced so as to simply the welding work process. In detail, in the 1st embodiment, four of the second metal terminals 114 without the connecting portions 114a are integrated with four of the first metal terminals 113, respectively.

As shown in FIG. 2, the metal cover 120 includes an upper plate 122 and four sidewalls 123. The opening 121 of the metal cover 120 is disposed on the upper plate 122. Four sidewalls 123 surround the upper plate 122 and extend along a direction from the upper plate 122 toward the holder 110, and each of the four sidewalls 123 corresponds to each of the four lateral sides 112 of the holder 110, wherein at least one of the four sidewalls 123 includes an opening portion 124 being opened for the printed circuit board 150. Therefore, the position sensor 160 can be assembled last during the assembling process of the lens driving apparatus 100, so that the accuracy of the assembling process can be enhanced and the dimensional tolerances of the elements can be reduced so as to enhance the detected efficiency of the position sensor 160. In particular, in the 1st embodiment, only one of the four sidewalls 123 includes the opening portion 124. Therefore, the appearance of the metal cover 120 can be recognized easily so as to reduce the manufacturing difficulties. Furthermore, the opening portion 124 extends along a direction from the sidewall 123 near to the holder 110 toward the upper plate 122. Furthermore, an auxiliary frame 129 can be disposed in the metal cover 120, so that it is favorable for disposing the driving magnet 180 in the metal cover 120.

As shown in FIG. 3, the opening portion 124 is disposed opposite to the first metal terminals 113 when the metal cover 120 is coupled with the holder 110. Therefore, a position for disposing the printed circuit board 150 can be provided, and the first metal terminals 113 can be dodged during the assembling process, so that effects of the welding work related to the first metal terminals 113 to the printed circuit board 150 can be prevented.

As shown in FIG. 2 and FIG. 3, a number of the driving magnets 180 can be two, two of the driving magnets 180 are disposed on the two of the sidewalls 123 of the metal cover 120 respectively, and the two lateral sides 112 of the holder 110 corresponding to the two sidewalls 123 are without the first metal terminals 113. Therefore, the inner space of the lens driving apparatus 100 can be used effectively so as to maintain an overall compact size of the lens driving apparatus 100.

As shown in FIG. 2, the opening portion 124 is a notch facing to the holder 110. The opening portion 124 is a notch instead of a hole can prevent the deformation of the metal cover 120, so that the demand for size accuracy can be maintained.

As shown in FIG. 5, the printed circuit board 150 can further include a plurality of conductive joints 151, and each of the conductive joints is welded to connect with one of the second metal terminals 114, respectively. Therefore, the welding fixing section can be arranged away from the first metal terminals 113, so that the arrangements of the printed circuit board 150 and the first metal terminals 113 will not affect each other.

As shown in FIG. 4, an edge of at least one of the second metal terminals 114 includes a groove structure 114b. In detail, as the back schematic view of the metal plate 12 of FIG. 6C, the edge of the second metal terminal 114 including the groove structure 114b will have a groove shape after cutting along the cutting marks 12c during the production process. Therefore, flows of tin solder materials can be maintained in a controllable range under high temperature. In the 1st embodiment, the edge of each of the six second metal terminals 114 includes the groove structure 114b. Furthermore, as shown in FIG. 2 and FIG. 3, the second metal terminals 114 including the groove structures 114b are disposed on the other lateral side 112 of the holder 110 opposing to the lateral side 112 which the first metal terminals 113 are disposed on. Therefore, it is favorable for processing the welding work so as to reduce the damages of the holder 110 caused by the weld head.

Figure 7:
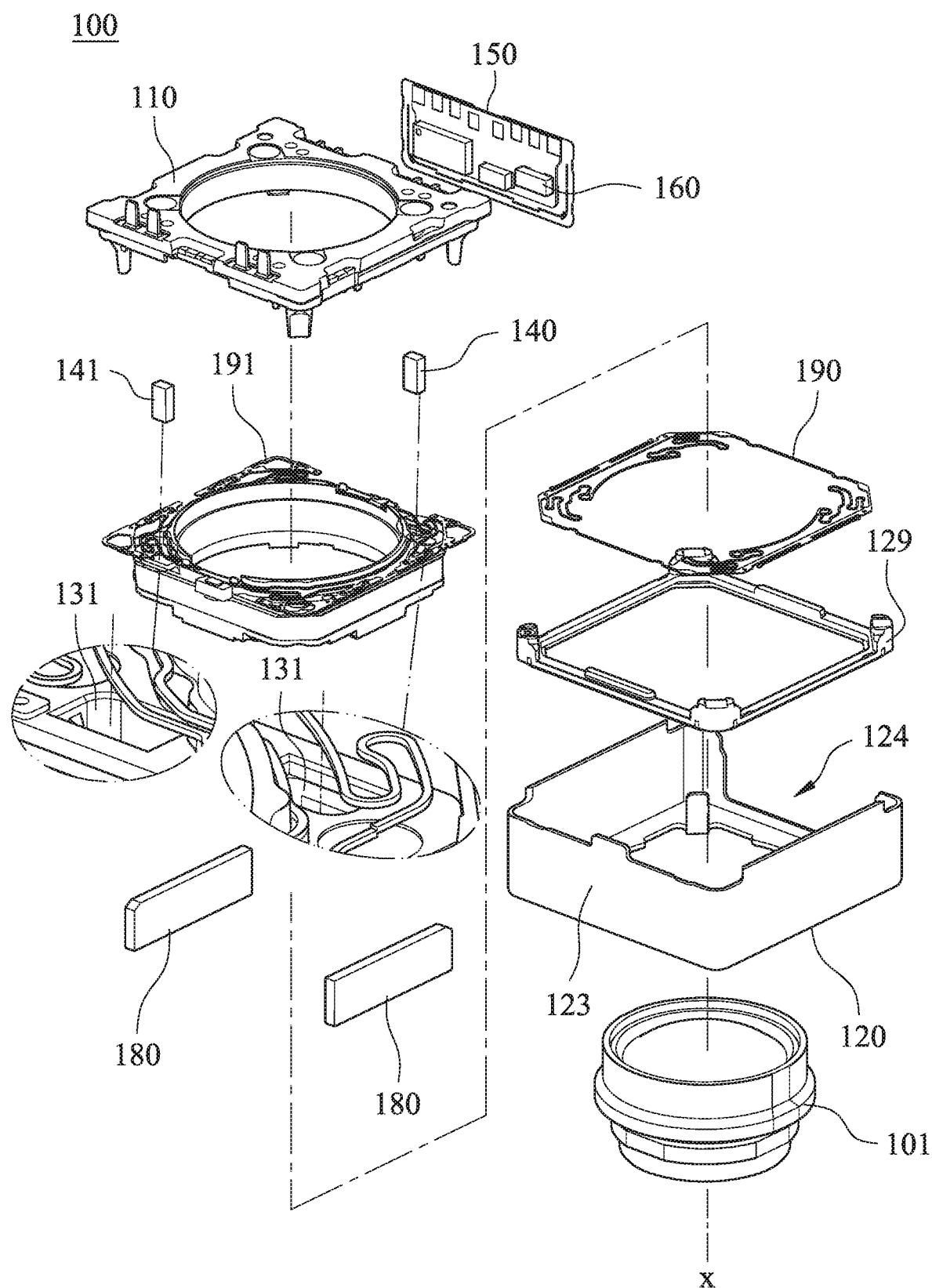
FIG. 7 is an exploded schematic view at another angle of the lens driving apparatus according to the 1st embodiment of FIG. 1.

FIG. 7 is another exploded schematic view of the lens driving apparatus 100 according to the 1st embodiment of FIG. 1. As shown in FIG. 7, the lens driving apparatus 100 can further include a compensation element 141, and the compensation element 141 is coupled with the carrier 130 and disposed opposite to the sensing magnet 140. In particular, the compensation element 141 can be but not be limited to a non-magnetic metal block for balancing weight. Therefore, the collimation level of the carrier 130 can be maintained so as to reduce the slant.

As shown in FIG. 7, the carrier 130 includes at least one inserting portion 131 for inserting the sensing magnet 140, and a hole of the inserting portion 131 can be facing to the holder 110, which is different from conventional arrangements that the sensing magnet 140 has to be disposed between the coil 170 and the carrier 130. Therefore, the sensing magnet 140 can be coupled with the carrier 130 more stably and reduce the effects to the winding of the coil 170. In particular, in the 1st embodiment, the carrier 130 includes two of the inserting portions 131 for inserting the sensing magnet 140 and the compensation element 141, respectively. Moreover, under an allowable case of the production method, the inserting portions 131 can be facing to the upper plate 122 of the metal cover 120, but not be limited thereto.

As shown in FIG. 5, when a central thickness of the position sensor 160 is h, the following condition is satisfied: h<1.0 mm. Therefore, the size of the lens driving apparatus 100 can be reduced and it is favorable for precisely detecting the displacement of the carrier 130 parallel to the optical axis X.

2nd Embodiment

Figure 8:
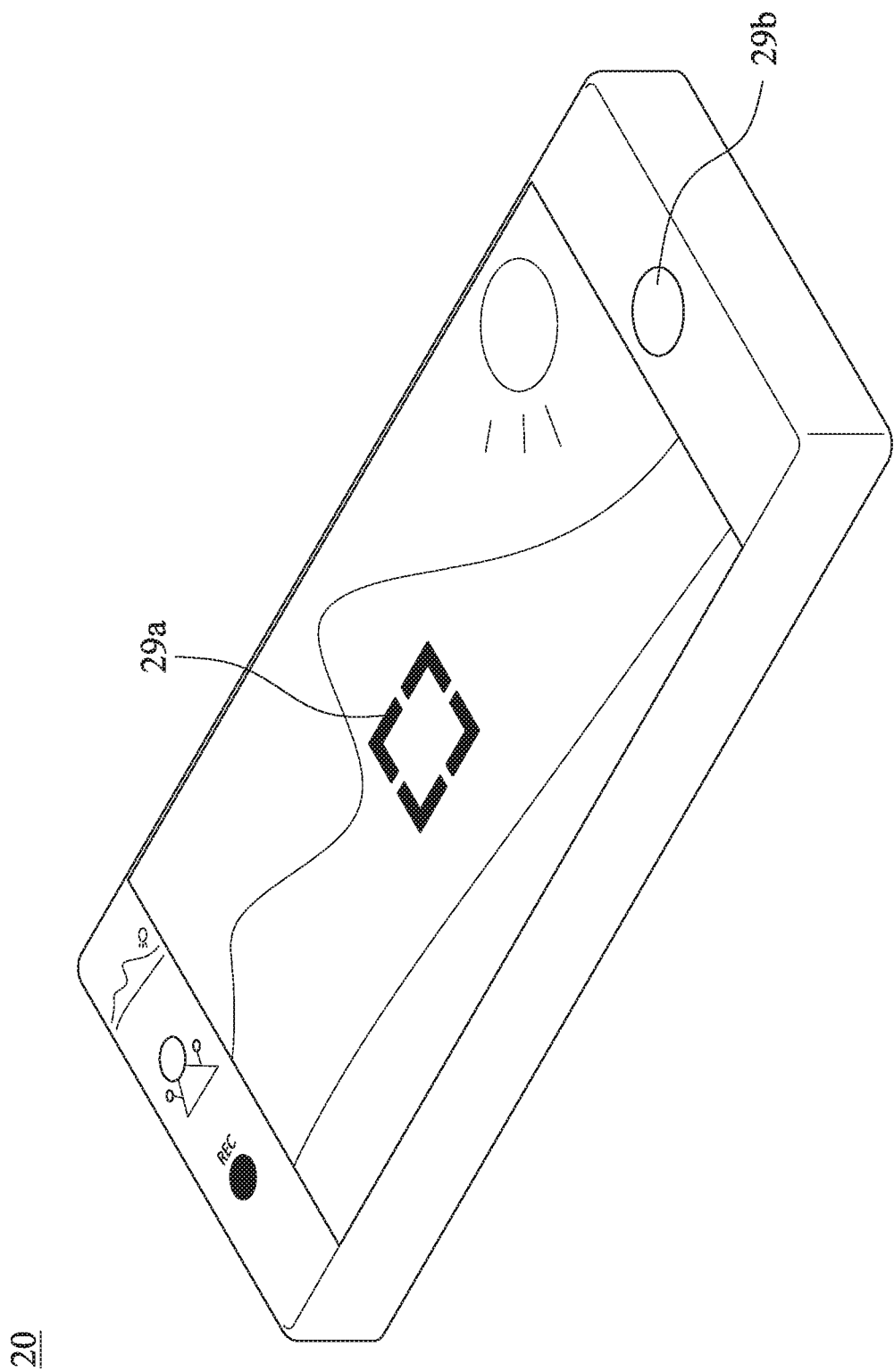
FIG. 8 is a schematic view of an electronic device according to the 2nd embodiment of the present disclosure.
Figure 9:
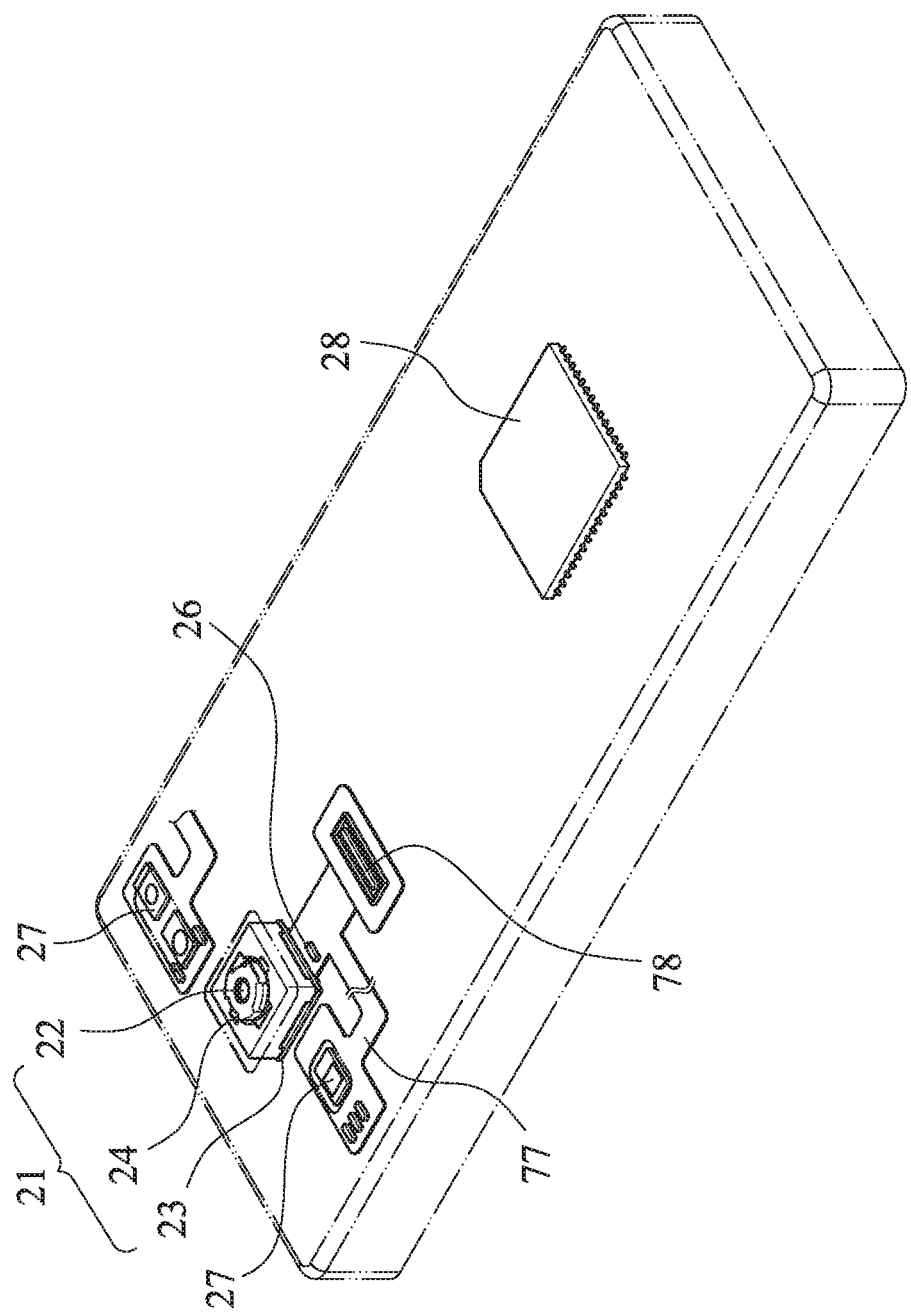
FIG. 9 is another schematic view of the electronic device according to the 2nd embodiment of the present disclosure.

FIG. 8 is a schematic view of an electronic device 20 according to the 2nd embodiment of the present disclosure. FIG. 9 is another schematic view of the electronic device 20 according to the 2nd embodiment of the present disclosure. In particular, FIG. 8 and FIG. 9 are schematic views of a camera of the electronic device 20. As shown in FIG. 8 and FIG. 9, the electronic device 20 of the 2nd embodiment is a smart phone. The electronic device 20 includes a photographing module 21 according to the present disclosure, the photographing module 21 includes a lens driving apparatus 24, a lens assembly 22 and an image sensor 23, wherein the image sensor 23 is disposed on an image surface (not show) of the lens assembly 22. Therefore, better image quality is obtained so that the demands for high quality of the image can be achieved.

Specifically, the user activates the capturing mode by the user interface 29 of the electronic device 20, wherein the user interface 29 of the 2nd embodiment can be a touch screen 29a, a button 29b, etc. At this moment, the lens assembly 22 collects imaging light on the image sensor 23 and outputs electronic signals associated with images to an image signal processor (ISP) 28.

Figure 10:
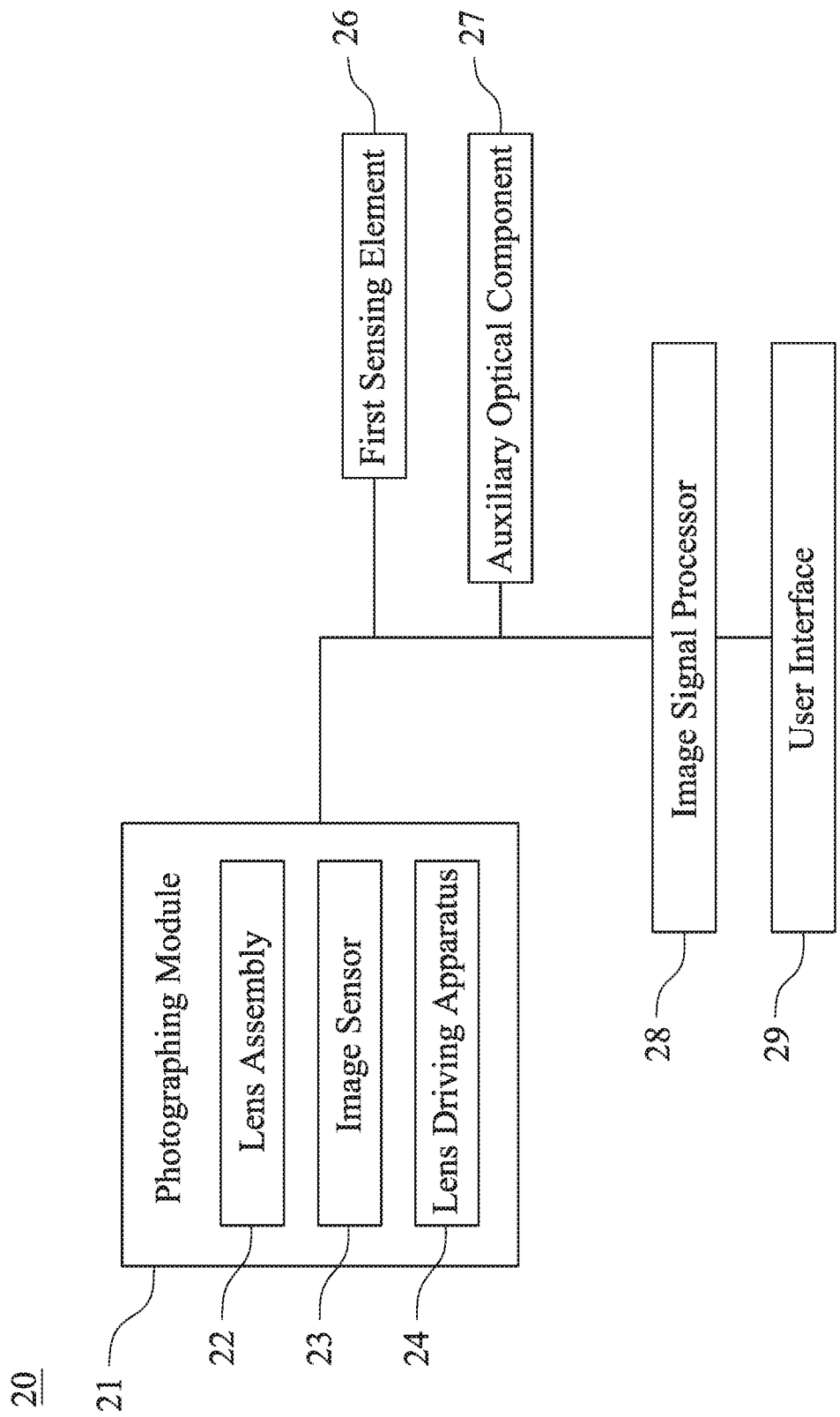
FIG. 10 is a block diagram of the electronic device according to the 2nd embodiment.

FIG. 10 is a block diagram of the electronic device 20 according to the 2nd embodiment, in particular, the block diagram of the camera of the electronic device 20. As shown in FIGS. 8 to 10, the electronic device 20 can further include at least one auxiliary optical component 27 and at least one first sensing element 26 in response to the camera specification of the electronic device 20. The auxiliary optical component 27 can be a flash module for compensating color temperature, an infrared distance measurement component, a laser focus module, etc. The first sensing element 26 can have functions for sensing physical momentum and kinetic energies, such as an accelerator, a gyroscope, and a hall effect element, so as to sense shaking or jitters applied by hands of the user or external environments, thus the lens driving apparatus 24 disposed on the photographing module 21 can function to obtain great image quality and facilitate the electronic device 20 according to the present disclosure to have a capturing function with multiple modes, such as taking optimized selfies, high dynamic range (HDR) with a low light source, 4K resolution recording, etc. Furthermore, the user can visually see the captured image of the camera through the touch screen 29a and manually operate the view finding range on the touch screen 29a to achieve the auto focus function of what you see is what you get.

Furthermore, as shown in FIG. 9, the photographing module 21, the first sensing element 26 and the auxiliary optical component 27 can be disposed on a flexible printed circuit board (FPC) 77 and electrically connected with an image signal processor 28 by a connector 78 so as to perform a capturing process. Because the current electronic devices have a tendency of being light and thin, the way of disposing the photographing module 21 and related elements on the flexible printed circuit board and then integrating the circuit into the main board of the electronic device via the connector can satisfy the mechanical design of the limited space inside the electronic device and the layout requirements and obtain more margins, so that the auto focus function of the photographing module 21 can be controlled more flexibly via the touch screen of the electronic device. In the 2nd embodiment, the electronic device 20 includes a plurality of first sensing elements 26 and a plurality of auxiliary optical components 27, the first sensing elements 26 and the auxiliary optical components 27 are disposed on the flexible printed circuit board 77 and at least one other flexible printed circuit board (reference number is not shown) and electrically connected with the associated elements, such as the image signal processor 28, by corresponding connectors so as to perform a capturing process. In other embodiments (not shown), the sensing component and the auxiliary optical component can also be disposed on the main board of the electronic device in other forms according to requirements of the mechanical design and the circuit layout.

Moreover, the electronic device 20 can further include, but not be limited to, a wireless communication unit, a control unit, a storage unit, a random-access memory (RAM), a read-only memory, or the combination thereof.

3rd Embodiment

Figure 11:
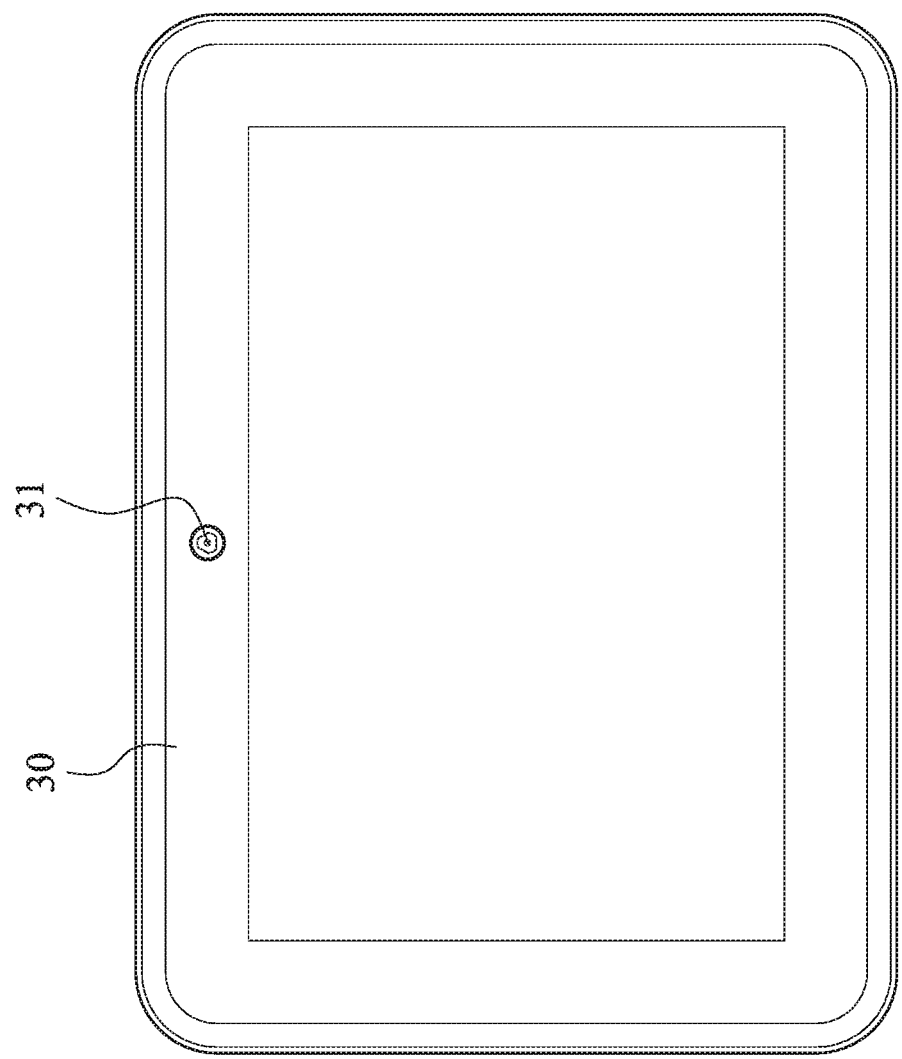
FIG. 11 is a schematic view of an electronic device according to the 3rd embodiment of the present disclosure.

FIG. 11 is a schematic view of an electronic device 30 according to the 3rd embodiment of the present disclosure. The electronic device 30 of the 3rd embodiment is a tablet, and the electronic device 30 includes a photographing module 31 according the present disclosure.

4th Embodiment

Figure 12:
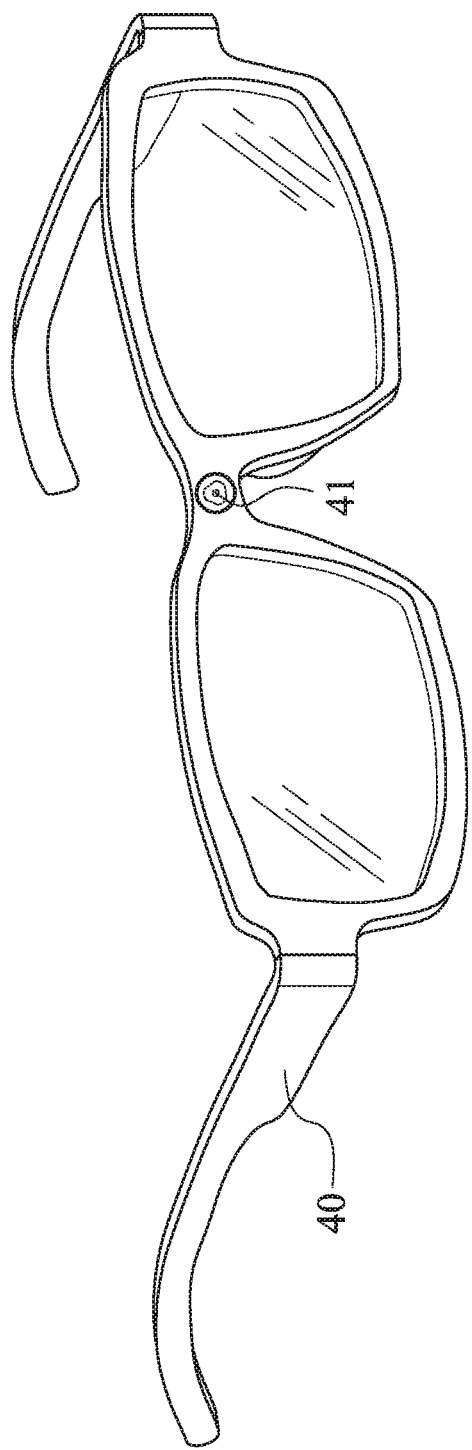
FIG. 12 is a schematic view of an electronic device according to the 4th embodiment of the present disclosure.

FIG. 12 is a schematic view of an electronic device 40 according to the 4th embodiment of the present disclosure. The electronic device 40 of the 4th embodiment is a wearable device, and the electronic device 40 includes a photographing module 41 according to the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens driving apparatus, comprising:
a holder being a rectangle and having a central opening and four sides;
a cover coupled with the holder and having an opening corresponding to the central opening of the holder;
a carrier assembled to a lens assembly having an optical axis, wherein the carrier is disposed in the cover and is movable along a direction parallel to the optical axis;

a sensing magnet coupled with the carrier;

a printed circuit board disposed near to one of the four sides of the holder in an upright form;

a position sensor disposed on the printed circuit board and corresponding to the sensing magnet for detecting a displacement parallel to the optical axis of the sensing magnet;

a coil disposed in the cover; and at least one driving magnet disposed in the cover and corresponding to the coil;

wherein only one of the coil and the at least one driving magnet is disposed on an outer surface of the carrier;

wherein the holder further comprises a plurality of first metal terminals and a plurality of second metal terminals, each of the first metal terminals is outwardly extended from the holder along the direction parallel to the optical axis, and each of the second metal terminals is fixedly connected with the printed circuit board;

wherein the first metal terminals are disposed only on one of the four sides of the holder, a number of the first metal terminals is at least three, the second metal terminals are disposed on at least one of the other three sides of the holder, a number of the second metal terminals is at least three, and at least two of the first metal terminals are electrically connected with at least two of the second metal terminals.

2. The lens driving apparatus of claim 1, wherein each of the first metal terminals is inserted on the holder by an insert molding process.

3. The lens driving apparatus of claim 1, further comprising:

an upper leaf spring connected to the carrier; and a lower leaf spring grouped with the upper leaf spring but separately connected to the carrier along the optical axis, wherein the lower leaf spring is disposed on one side of the carrier near to the holder, the lower leaf spring comprises a terminal connecting section, and the terminal connecting section is electrically connected with two of the second metal terminals.

4. The lens driving apparatus of claim 3, wherein each of the two second metal terminals electrically connected with the lower leaf spring comprises a connecting portion for electrically connecting with the terminal connecting section.

5. The lens driving apparatus of claim 4, wherein at least two other of the second metal terminals are without the connecting portions and integrated with at least two of the first metal terminals, respectively.

6. The lens driving apparatus of claim 1, wherein the cover comprises:

an upper plate, wherein the opening of the cover is disposed on the upper plate; and four sidewalls surrounding the upper plate and extending along a direction from the upper plate toward the holder, each of the four sidewalls corresponding to each of the four sides respectively, wherein at least one of the four sidewalls comprises an opening portion being opened for the printed circuit board.

7. The lens driving apparatus of claim 6, wherein only one of the four sidewalls comprises the opening portion.

8. The lens driving apparatus of claim 6, wherein the opening portion is disposed opposite to the first metal terminals when the cover is coupled with the holder.

9. The lens driving apparatus of claim 6, wherein a number of the driving magnet is two, the two driving magnets are disposed on the two of the sidewalls respectively, and the two sides of the holder corresponding to the two of the sidewalls respectively are without the first metal terminals.

10. The lens driving apparatus of claim 6, wherein the opening portion is a notch facing to the holder.

11. The lens driving apparatus of claim 1, wherein the printed circuit board comprises a plurality of conductive joints, and each of the conductive joints is welded to connect with one of the second metal terminals, respectively.

12. The lens driving apparatus of claim 1, wherein an edge of at least one of the second metal terminals comprises a groove structure.

13. The lens driving apparatus of claim 12, wherein the second metal terminal comprising the groove structure is disposed on the other side of the holder opposing to the side which the first metal terminals are disposed on.

14. The lens driving apparatus of claim 1, further comprising:

a compensation element coupled with the carrier and disposed opposite to the sensing magnet.

15. The lens driving apparatus of claim 1, wherein the carrier comprises at least one inserting portion for inserting the sensing magnet, and a hole of the inserting portion is facing to the holder.

16. The lens driving apparatus of claim 1, wherein a central thickness of the position sensor is h, and the following condition is satisfied:

$$h<1.0 \text{ mm}.$$

17. The lens driving apparatus of claim 1, wherein a surface of each of the first metal terminals comprises a gilding layer.

18. The lens driving apparatus of claim 1, wherein each of the second metal terminals has an arc shape and extends around the central opening of the holder.

19. A photographing module, comprising:

the lens driving apparatus of claim 1; and an image sensor for receiving an imaging light from the lens assembly.

20. An electronic device, comprising:

the photographing module of claim 19.

* * * * *